(12) United States Patent
Klein

(10) Patent No.: US 7,785,030 B2
(45) Date of Patent: Aug. 31, 2010

(54) CONNECTING ELEMENT

(75) Inventor: Jean-Luc Klein, Ringendorf (FR)

(73) Assignee: TRW AUtomotive Electronics & Components GmbH & Co. KG, Enkenbach-Aisenborn (DE)

( * ) Notice: Subject to any disclaimer, the term of this patent is extended or adjusted under 35 U.S.C. 154(b) by 0 days.

(21) Appl. No.: 11/583,552

(22) Filed: Oct. 19, 2006

(65) Prior Publication Data

US 2007/0098523 A1    May 3, 2007

(30) Foreign Application Priority Data

Oct. 26, 2005    (DE) .................. 20 2005 016 824 U

(51) Int. Cl.
    *F16B 19/00*    (2006.01)
(52) U.S. Cl. .................. 403/408.1; 411/508; 24/453
(58) Field of Classification Search .................. 411/508, 411/509, 510, 913; 403/408.1, 329; 24/297, 24/453
See application file for complete search history.

(56) References Cited

U.S. PATENT DOCUMENTS

| | | | |
|---|---|---|---|
| 5,651,634 A * | 7/1997 | Kraus | ...................... 403/408.1 |
| 6,039,523 A | 3/2000 | Kraus | |
| 6,336,768 B1 | 1/2002 | Kraus | |
| 6,984,096 B2 | 1/2006 | Kraus | |
| 7,213,378 B2 * | 5/2007 | Randez Perez et al. | ......... 24/297 |
| 2006/0000064 A1 * | 1/2006 | Leverger et al. | ............... 24/297 |

FOREIGN PATENT DOCUMENTS

| | | | |
|---|---|---|---|
| DE | 29718487 | | 2/1998 |
| DE | 19748780 | | 5/1998 |
| DE | 19753678 | | 6/1999 |
| DE | 10023109 | | 11/2001 |
| DE | 100 64 017 | * | 5/2002 |
| EP | 0648944 | | 4/1995 |
| EP | 0761986 | | 3/1997 |
| FR | 2800833 | | 5/2001 |

* cited by examiner

*Primary Examiner*—Michael P Ferguson
(74) *Attorney, Agent, or Firm*—Tarolli, Sundheim, Covell & Tummino LLP

(57) ABSTRACT

A connecting element (10), in particular for connecting a lining piece with a support, includes a head part (12) for fastening to the lining piece, and a foot part (14) for fastening to the support. The head part (12) and the foot part (14) are connected with each other elastically so that the foot part (14) is movable relative to the head part (12) in directions perpendicular to a central axis (A) of the connecting element (10).

12 Claims, 2 Drawing Sheets

CONNECTING ELEMENT

TECHNICAL FIELD

The invention relates to a connecting element, in particular for connecting an inner lining piece of a vehicle with a support.

BACKGROUND OF THE INVENTION

From DE 197 53 678 A1 such a connecting element with a head part for fastening to the lining piece, and a foot part for fastening to the support is known. At one end of the connecting element a head part is situated, which is fastened to the lining piece before assembly. A foot part in the form of a spreader element which is inserted, on assembly, into an opening provided on the support, is situated at the other end of the connecting element. By applying pressure on the lining piece, the spreader element is spread by a cone and thereby the foot part is locked in the support.

It is an object of the invention to facilitate the mounting of a lining piece on a support by a connecting element, and to make possible a better tolerance balance.

BRIEF SUMMARY OF THE INVENTION

According to the invention, a connecting element, in particular for connecting a lining piece with a support, includes a head part for fastening to the lining piece, and a foot part for fastening to the support. The head part and the foot part are connected with each other elastically so that the foot part is movable relative to the head part in directions perpendicular to a central axis of the connecting element. The elastic bearing of the foot part allows a continuous displacement of the foot part when the lining piece is being mounted. The foot part can thereby adapt itself automatically to the position of the corresponding opening in the support, and can engage securely. If the distances of the connecting elements on the lining piece do not coincide exactly with the distances of the associated openings on the support, the connecting elements, which are movable inherently, permit a corresponding equalization, so that no stresses occur in the lining piece after mounting, either.

DETAILED DESCRIPTION OF THE PREFERRED EMBODIMENT

Figure 1A:
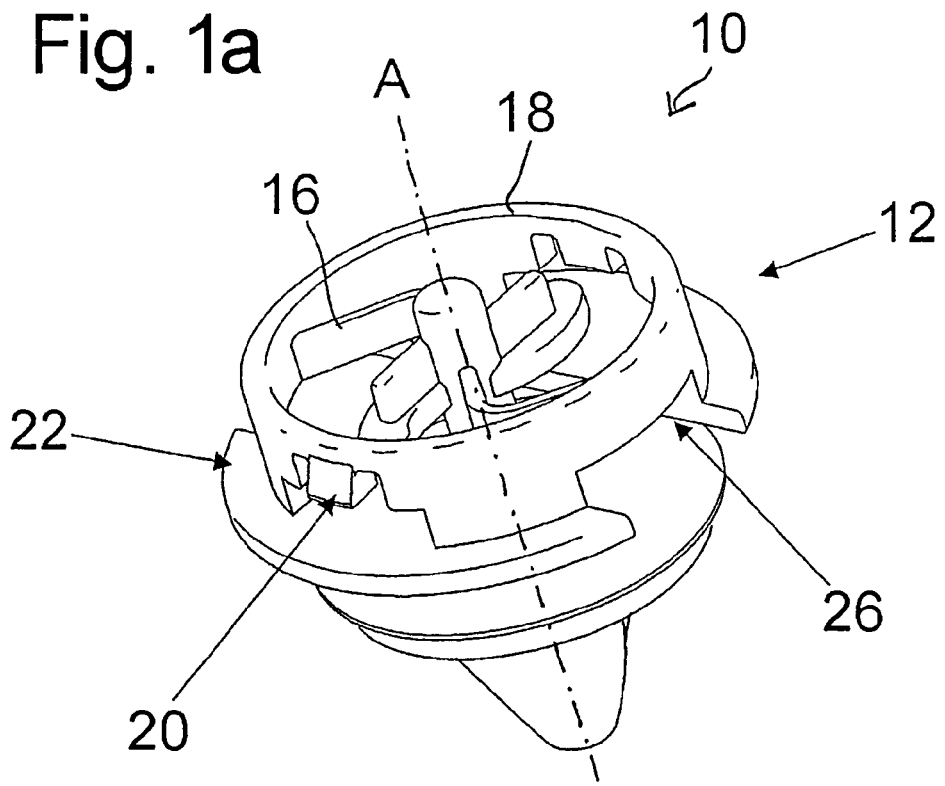
FIGS. 1a, 1b show two different perspective views of a connecting element according to the invention, with a view onto the head part.

The connecting element 10 according to the invention as illustrated in the Figures is provided for attaching a vehicle interior lining piece to a support, e.g. a vehicle door plate. The connecting element 10 comprises a head part 12 and a foot part 14 which are connected with each other elastically by two undulating springs 16.

The head part 12 has a cylinder section 18, concentric to a central axis A of the connecting element 10, with detent noses 20. A partially encircling outer flange 22 and an inner flange 24 are formed at the same height on the cylinder section 18. The flanges 22, 24 are interrupted by a passage 26.

The foot part 14 has an elastic, tapered clip profile 28. A spring plate 30 and an optional foam seal 32 are arranged above the clip profile 28. A central pin 34 extends in the axial direction from the clip profile 28 through the passage 26 to beyond the cylinder section 18 of the head part 12. A support profile 36 is formed on the pin 34. The undulating springs 16 are connected at their inner ends with the pin 34 and at their outer ends with the inner side of the cylinder section 18.

Before the lining piece is attached to the support, the connecting element 10 is arranged on the lining piece. This is done by pressing the connecting element 10 with the head part 12 frontally (i.e. in the direction of the axis A) into a mounting of the lining piece which is adapted to the head part 12, until the detent noses 20 engage in the mounting. The outer flange 22 serves as a stop and allows the connecting element 10 to be held during the mounting process.

Because the head end 38 of the pin 34 projects beyond the cylinder section 18 of the head part 12, the foot part 14 is pressed out from its initial position away from the lining piece into a mounting position when the head part 12 is being fastened to the lining piece.

Figure 2:
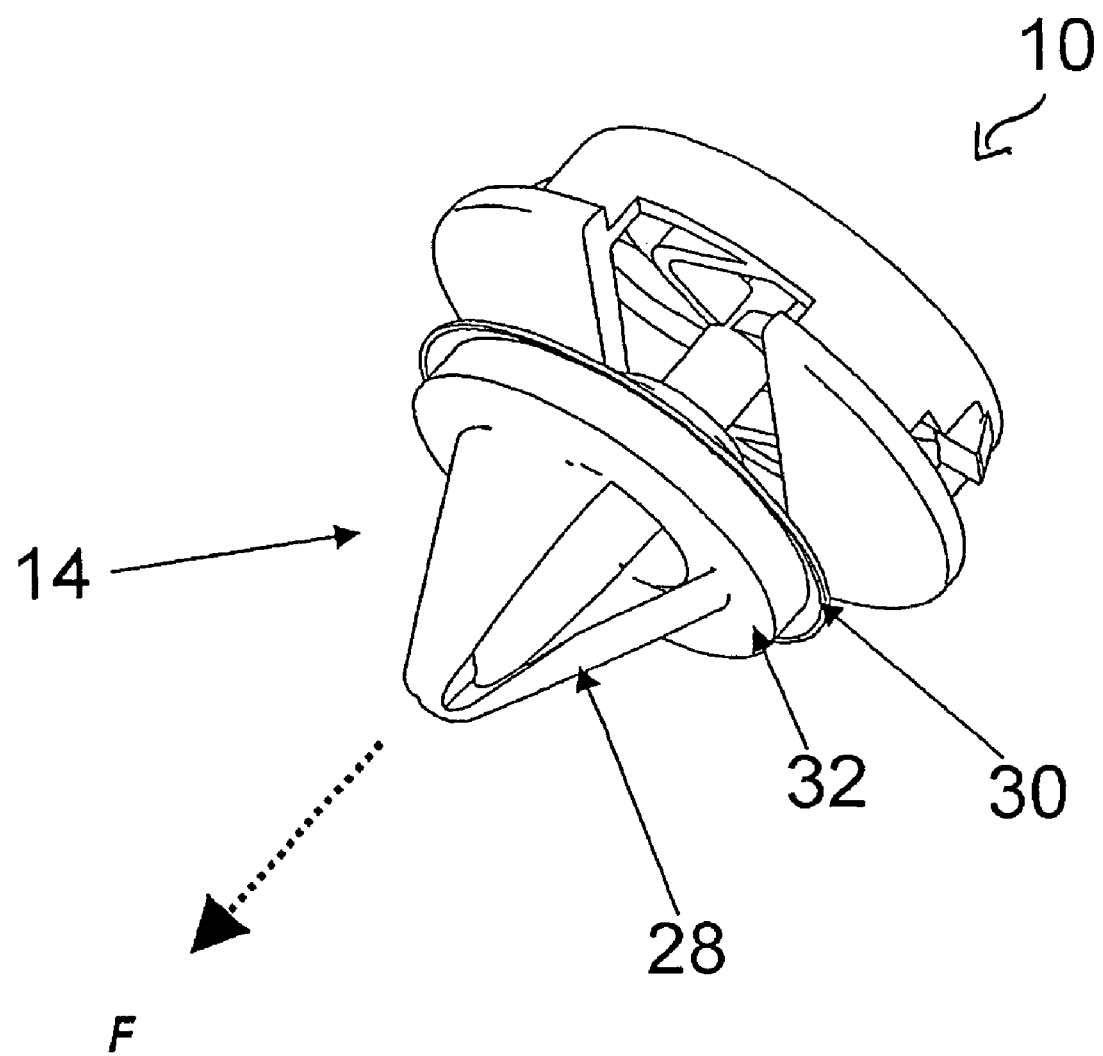
FIG. 2 shows a perspective view of the connecting element with a view onto the foot part.

The lining piece is then mounted on the support, by the foot part 14 of the connecting element 10 being inserted with the clip profile 28 into a matching opening of the support, and engaging there. As the head end 38 of the pin 34 rests on the mounting of the lining piece, an undesired displacement back of the foot part 14 is avoided in this procedure. Moreover, the preceding axial displacement of the foot part 14 into the mounting position leads to the support profile 36 of the foot part 14 resting on the inner flanges 24 of the head part 12, in order to enable to receive the axial withdrawal forces F (see FIG. 2) in the mounted state of the lining piece. The spring plate 30 serves to equalize the thickness of the support and for sealing. The sealing effect can be increased by the optional foam seal 32.

Figure 1B:
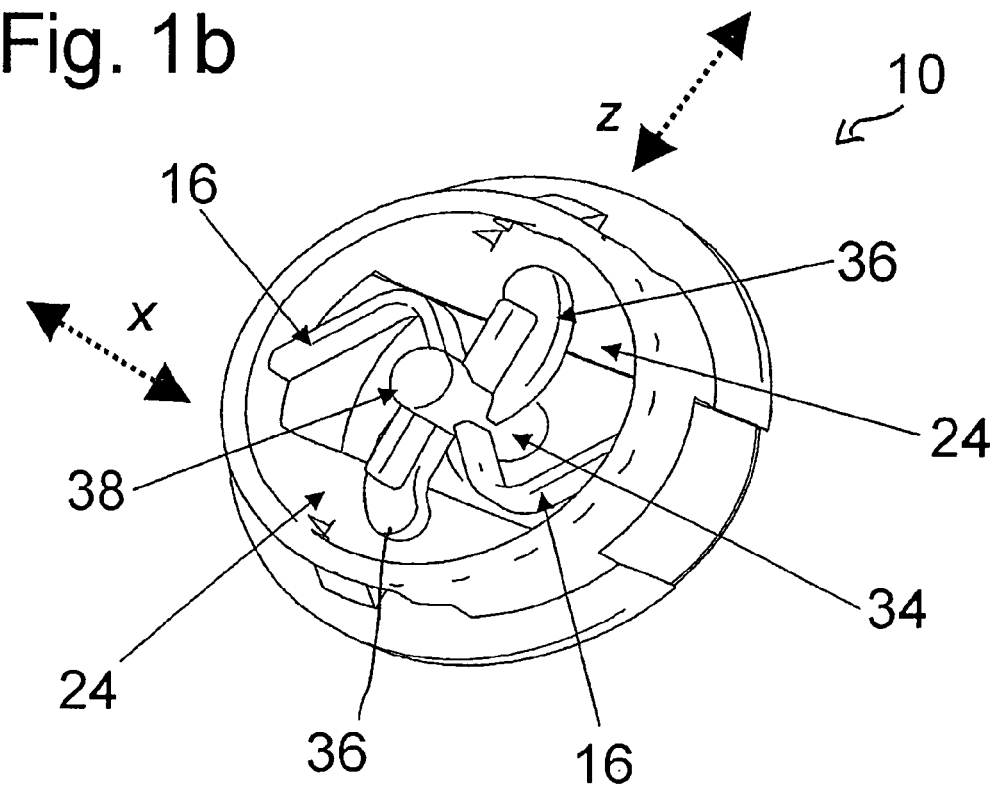

The elastic bearing of the foot part 14 allows a displacement of the foot part 14 relative to the head part 12 of the connecting element, which is securely arranged on the lining part, transversely to the direction of insertion (perpendicular to axis A, see arrows X and Z in FIG. 1b) during the mounting of the lining piece. The limits of mobility can be predefined by the design of the springs 16 and the dimensions of the passage 26. It is possible thereby to equalize inaccuracies in the positioning of the connecting element 10 over the opening of the support. The mobility of the foot part 14 is also maintained after mounting, so that stresses of the mounted lining piece are avoided.

Of the mounting procedure, in particular the step of fastening the connecting element 10 to the lining piece is able to be automated, because the connecting element does not require any assembly and is brought into connection with the lining piece by frontal insertion into the mounting of the lining piece, i.e not by being pushed on laterally or suchlike.

After the lining piece is dismantled, the foot part 14 returns into its original central position. In the case of a renewed mounting, however, the foot part 14 is able to be displaced again, if required.

The connecting element 10 may be produced in one operating step in one piece from a single material in an injection moulding process by using special core/slider profiles. No refinishing or assembly of the connecting element 10 is necessary.

The use of the connecting element according to the invention is not restricted to the described application.

The invention claimed is:

1. A connecting element for connecting a lining piece with a support, the connecting element including a head part for fastening to the lining piece, the head part including a cylindrical wall having an outer surface for fastening to the lining piece and an inner surface defining a cavity, the cylindrical wall including an inner flange radially extending from the inner surface and defining a radially extending bearing surface of the head part, a foot part for fastening to the support, a pin extending from the foot part to the head part and being axially disposed within the cavity, and a spring element irremovably connected to the pin and extending from the pin to the head part and between the pin and the inner surface of the cylindrical wall, said pin and said spring element connecting the head part to the foot part, the head part and the foot part being connected with each other elastically by the pin and the spring element so that the foot part is movable relative to the head part in directions perpendicular to a central axis of the connecting element, the foot part moving in an axial direction relative to the head part from an initial position spaced a first distance from the head part into a mounting position spaced a second, greater distance from the head part when a predetermined force is applied to the foot part during fastening of the head part to the lining piece, wherein a radially extending support leg extends from the pin and axially rests on an axial outer side of the flange defining the radially extending bearing surface of the head part in the mounting position.

2. The connecting element according to claim 1, wherein the pin projects in an axial direction away from the foot part and beyond the head part.

3. The connecting element according to claim 1, wherein the cylindrical wall of said head part includes detent noses that are configured to engage a mounting of the lining piece.

4. The connecting element according to claim 1, wherein the foot part has an elastic, tapered clip profile, the clip profile being elastic and tapered to facilitate the insertion of the foot part into an opening of the support and the engagement therein after the connecting element is arranged on the lining piece.

5. The connecting element according to claim 1, wherein the foot part has at least one sealing element, the sealing element being configured to seal an opening of the support when the connecting element together with the lining piece arranged thereon is mounted at the opening.

6. The connecting element according to claim 1, wherein the spring element and the pin are formed as one-piece.

7. A connecting element for connecting a lining piece with a support, the connecting element including a head part for fastening to the lining piece, the head part including a cylindrical wall having an outer surface for fastening to the lining piece and an inner surface defining a cavity, the cylindrical wall including an inner flange radially extending from the inner surface and defining a radially extending bearing surface of the head part, a foot part for fastening to the support, a pin extending from the foot part to the head part and being axially disposed within the cavity, and a spring element irremovably connected to the pin and extending from the pin to the head part and between the pin and the inner surface of the cylindrical wall, said pin and said spring element connecting the head part to the foot part, the head part and the foot part being connected with each other elastically by the pin and the spring element so that the foot part is movable relative to the head part in directions perpendicular to a central axis of the connecting element, the foot part moving in an axial direction relative to the head part from an initial position spaced a first distance from the head part into a mounting position spaced a second, greater distance from the head part when a predetermined force is applied to the foot part during fastening of the head part to the lining piece, wherein a radially extending support leg extends from the pin and axially rests on an axial outer side of the flange defining the radially extending bearing surface of the head part in the mounting position, wherein the head part and the foot part are constructed as a single piece.

8. The connecting element according to claim 7, wherein the connecting element is produced from a single material in an injection molding process.

9. A connecting element for connecting a lining piece with a support, the connecting element comprising:

a head part configured to be fastened to the lining piece, the head part including a cylindrical wall having an outer surface for fastening to the lining piece and an inner surface defining a cavity, the cylindrical wall including an inner flange radially extending from the inner surface and defining a radially extending bearing surface of the head part, a foot part configured to be fastened to the support;

a pin extending from the foot part to the head part and being axially disposed within the cavity; and a spring element irremovably connected to the pin and extending radially from the pin to the head part and between the pin and the inner surface of the cylindrical wall, the pin and spring element elastically connecting the head part to the foot part, the foot part moving relative to the head part in directions perpendicular to a central axis of the connecting element to flex the spring element when a predetermined radial force is applied, the foot part moving in an axial direction relative to the head part from an initial position spaced a first distance from the head part into a mounting position spaced a second, greater distance from the head part when a predetermined force is applied to the foot part during fastening of the head part to the lining piece, a radially extending support leg extending from the pin and moving in the axial direction during movement of the foot part from the initial position into the mounting position, the support leg axially engaging an axial outer side of the flange defining the radially extending bearing surface of the head part in the mounting position in order to receive axial withdrawal forces of the connecting element.

10. The connecting element according to claim 9, wherein said cylindrical wall of said head part is concentric to the central axis of the connecting element.

11. The connecting element according to claim 10, wherein the support leg extends from the pin to the flange.

12. The connecting element according to claim 10, wherein the support leg is spaced from the flange when the foot part is in the initial position.

* * * * *